(12) United States Patent
Ozturk et al.

(10) Patent No.: US 12,325,055 B2
(45) Date of Patent: Jun. 10, 2025

(54) SHEET FORMING SYSTEM

(71) Applicant: TUSAS—TURK HAVACILIK VE UZAY SANAYII ANONIM SIRKETI, Ankara (TR)

(72) Inventors: Fahrettin Ozturk, Ankara (TR); Abdullah Naki Polat, Ankara (TR); Remzi Ecmel Ece, Ankara (TR); Haci Mehmet Sever, Ankara (TR); Emre Erol, Ankara (TR)

(73) Assignee: TUSAS- TURK HAVACILIK VE UZAY SANNAYII ANONIM SIRKETI, Ankara (TR)

( * ) Notice: Subject to any disclaimer, the term of this patent is extended or adjusted under 35 U.S.C. 154(b) by 282 days.

(21) Appl. No.: 18/015,481

(22) PCT Filed: Apr. 14, 2021

(86) PCT No.: PCT/TR2021/050351
§ 371 (c)(1),
(2) Date: Jan. 10, 2023

(87) PCT Pub. No.: WO2022/015267
PCT Pub. Date: Jan. 20, 2022

(65) Prior Publication Data
US 2023/0286029 A1    Sep. 14, 2023

(30) Foreign Application Priority Data

Jul. 17, 2020   (TR) .................................. 2020/11405

(51) Int. Cl.
*B21D 37/16*   (2006.01)
*B21D 22/02*   (2006.01)
(Continued)

(52) U.S. Cl.
CPC ............ *B21D 22/022* (2013.01); *B21D 37/10* (2013.01); *B21D 37/16* (2013.01); *H05B 6/101* (2013.01)

(58) Field of Classification Search
CPC ...... B21D 22/022; B21D 37/10; B21D 37/16; B21D 22/208; H05B 6/101; B29C 2035/0811
See application file for complete search history.

(56) References Cited

U.S. PATENT DOCUMENTS 10,737,315 B2 *   8/2020   Hirata .................... B21D 37/02
2004/0200550 A1   10/2004  Pfaffmann et al.
(Continued)

OTHER PUBLICATIONS

FR 2612431A1, Courbis Sep. 1988.*
(Continued)

*Primary Examiner* — Edward T Tolan
(74) *Attorney, Agent, or Firm* — Notaro, Michalos & Zaccaria P.C

(57) ABSTRACT

A sheet forming system has a body, at least one lower jaw and/or at least one upper jaw, located on the body so as to stay opposite to each other and move towards each other to apply force for the shaping process, at least two plates located on the lower jaw and/or upper jaw to provide strength against the force applied by the lower jaw and/or upper jaw thereto, at least two isolation sheets located on each plate so as to stay opposite to each other to provide heat insulation, at least one male die and at least one female die positioned on the isolation sheet on the lower jaw and/or upper jaw, and being able to be placed into each other in a completely form compliant manner, at least one workpiece positioned between the male die and female die and being shaped by applying heat thereto.

14 Claims, 2 Drawing Sheets

Figure 1:
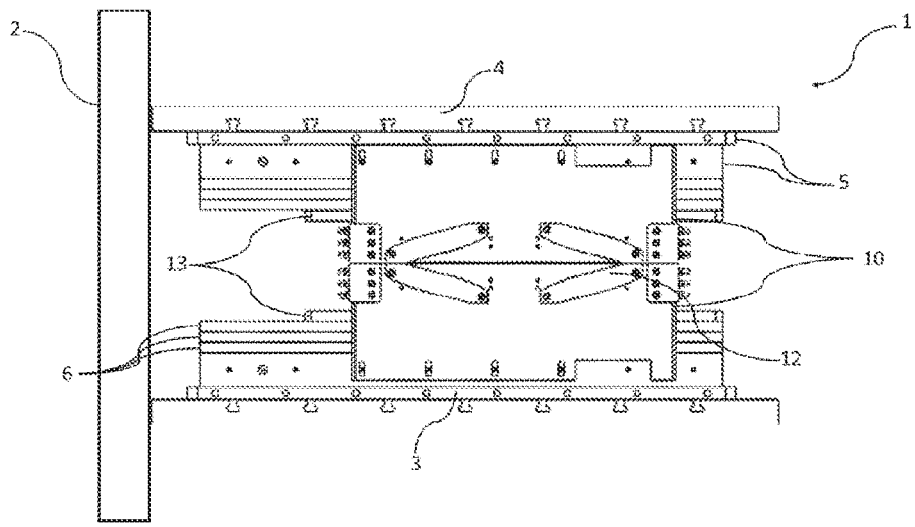

(51) Int. Cl.
 *B21D 37/10* (2006.01)
 *H05B 6/10* (2006.01)

(56) References Cited

U.S. PATENT DOCUMENTS

| | | |
|---|---|---|
| 2007/0063385 A1 | 3/2007 | Carsley et al. |
| 2009/0241628 A1* | 10/2009 | Wang .................... B21D 37/02 |
| | | 72/350 |
| 2012/0018422 A1 | 1/2012 | Bohner et al. |
| 2013/0068756 A1* | 3/2013 | Doerr ....................... C21D 9/46 |
| | | 432/247 |
| 2013/0160511 A1 | 6/2013 | Huang |
| 2015/0013421 A1* | 1/2015 | Choda ...................... B21J 13/03 |
| | | 72/342.8 |

OTHER PUBLICATIONS

WO 2011/157266A2, Bohme et al. Dec. 2011.*
CN 107052170A, Zhuang et al. Aug. 2017.*
CN 107999593A, Zhuang et al. May 2018.*
International Search Report and Written Opinion for PCT application No. PCT/TR2021/050351, mailed Aug. 6, 2021.
International Preliminary Report on Patentability, completed Sep. 15, 2022.
Demand/Request for Preliminary Examination dated May 11, 2022.
International Application Status Report generated Dec. 28, 2022.
Written Opinion of International Preliminary Examining Authority mailed Jun. 13, 2022.
Response to Written Opinion of International Preliminary Examining Authority dated Aug. 11, 2022.

* cited by examiner

SHEET FORMING SYSTEM

This invention relates to the shaping of materials in sheet form used in aircraft and space in forms of predetermined by the user.

Sheet shaping processes are used to ensure that the materials are brought to appropriate forms determined by the user for engineering applications. Induction heating method can be used to render superplastic forming, the curing processes of composite materials and the heat treatment of thermoplastic materials more efficient.

The United States patent application document no. US20070063385, which is included in the known state of the art, discloses a method of shaping sheet materials under heat by rapid heating. It is mentioned about two male and female dies positioned so that they can move towards each other in said system. Heaters consisting of induction coils are placed between the dies. It is disclosed that superplastic forming and quick plastic forming processes are carried out.

Thanks to a sheet forming system developed by the present invention, it is provided that a workpiece is homogeneously heated and cooled in a faster manner during sheet forming.

A further object of the present invention is to develop a sheet forming system which can also be suitably used in different dies.

The sheet forming system for achieving the object of the invention, as defined in the first claim and in the claims dependent thereon, comprises a body, at least one lower jaw and at least one upper jaw, capable to exert force for a shaping process to be carried out, located on the body so as to be opposite to each other, and able to move towards each other on the body, at least two plates positioned on the lower jaw and/or upper jaw and durable against the force exerted by the lower jaw and/or upper jaw, at least two isolation sheets positioned on each plate so as to stay opposite to each other to provide isolation, at least one male die and at least one female die positioned on the lower jaw and/or upper jaw so as to contact the insulation plate and to be placed into one another in an almost form fitting manner, at least one workpiece positioned so as to remain between the male die and the female die and shaped by applying heat.

The sheep forming system of the invention comprises at least one lateral wall mounted detachably to the body and disposed in such a way as to almost completely surround the periphery of each isolation sheet and each plate, as well as at least one induction heater disposed in such a way as to almost completely surround the workpiece mounted detachably to the lateral walls.

In an embodiment of the invention, the sheet forming system comprises at least one connection element that enables the induction heater to be detachably mounted to the lateral walls so that there is a certain distance between the lateral walls and the induction heater.

In an embodiment of the invention, the sheet forming system comprises at least two insulation plates located between the male die and the isolation sheet positioned against the male die and between the female die and the isolation sheet positioned against the female die and capable to reduce the amount of heat reaching each isolation sheet.

In an embodiment of the invention, the sheet forming system comprises at least one duct extending along the length of the plates on each plate, through which a coolant can be passed.

In an embodiment of the invention, the sheet forming system comprises an insulating coating applied to the inner lateral surfaces of the lateral walls positioned so as to face the induction heater.

In an embodiment of the invention, the sheet forming system comprises at least one sealing element applied onto the lateral walls and controlling the air permeability of the lateral walls during the sheet forming operations.

In an embodiment of the invention, the sheet forming system comprises a first sealing element applied such that it is in the form of a linear strip on the lateral wall positioned on the lower jaw and a second sealing element applied such that it is in the form of a linear strip on the lateral wall positioned on the upper jaw.

In an embodiment of the invention, the sheet forming system comprises a first sealing element and a second sealing element applied to the lateral walls so as to completely contact with each other during the forming process of the workpiece placed between the male die and the female die.

In an embodiment of the invention, the sheet forming system comprises lateral walls that provide strength as a bearer against the force applied by the lower jaw and upper jaw by closing the opposite lateral walls so as to contact each other as a result of the movement of the lower jaw and upper jaw towards each other.

In an embodiment of the invention, the sheet forming system comprises an induction heater consisting of flat coils.

In an embodiment of the invention, the sheet forming system comprises an isolation sheet made of a material that may be a mica and/or ceramic material.

In an embodiment of the invention, the sheet forming system comprises plates made of an aluminum and/or steel material.

In an embodiment of the invention, the sheet forming system comprises a workpiece made of a metal or a composite material.

In an embodiment of the invention, the sheet forming system comprises an insulation plate made of a stainless steel material.

The sheet forming system realized to achieve the object of the present invention is shown in the accompanying figures, wherein among these figures.

Figure 2:
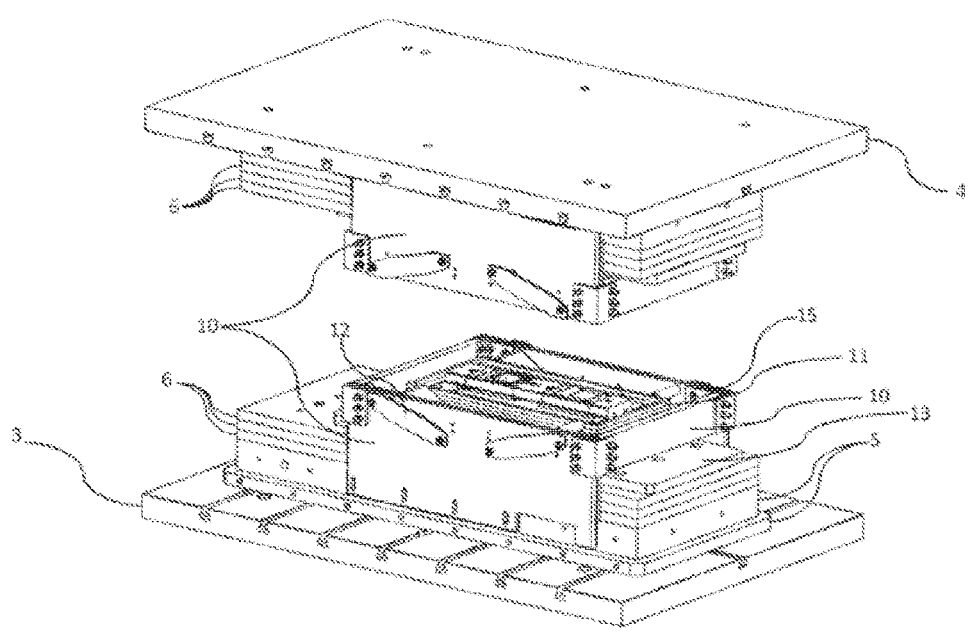

FIG. 1—is a side view of the sheet forming system,

FIG. 2—is a perspective view of the sheet forming system.

Figure 3:
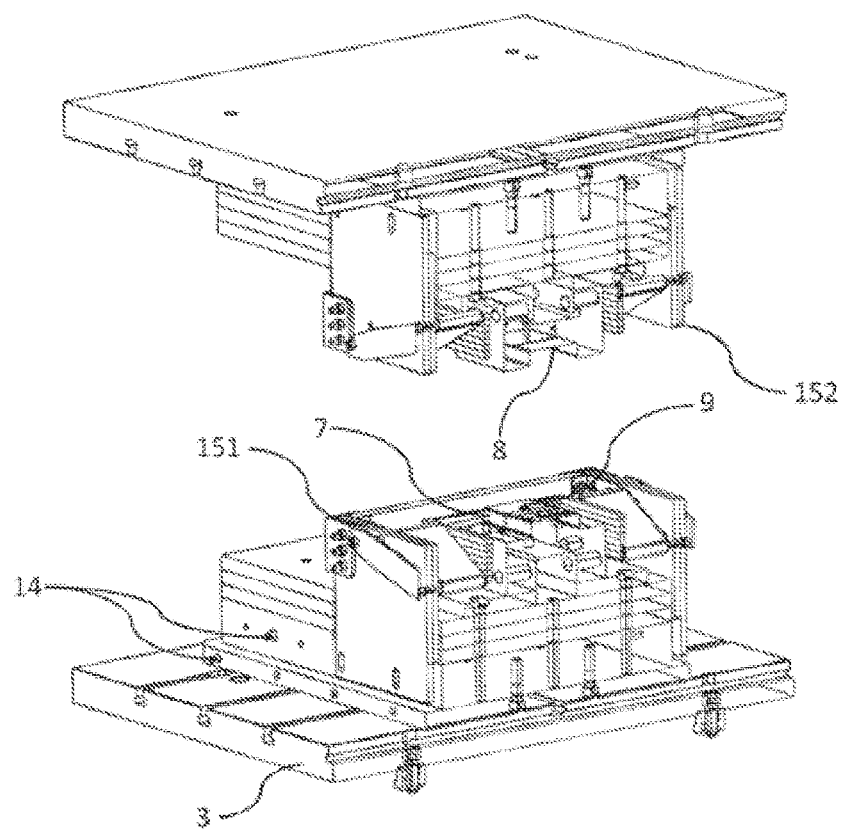

FIG. 3—is a perspective view of the plate, isolation sheet, male die, female die, lateral walls and induction heater.

All the parts illustrated in figures are individually assigned a reference numeral and the corresponding terms of these numbers are listed below.

1. Sheet forming system
2. Body
3. Lowerjaw
4. Upperjaw
5. Plate
6. Isolation sheet
7. Male die
8. Female die
9. Workpiece
10. Lateral wall
11. Induction heater
12. Connection element
13. Insulation plate
14. Duct
15. Sealing element
151. First sealing element

152. Second sealing element

The sheet forming system (1) comprises a body (2), at least one lower jaw (3) and/or at least one upper jaw (4), located on the body (2) so as to stay opposite to each other and to move towards each other to apply force for the shaping process, at least two plates (5) located on the lower jaw (3) and/or upper jaw (4) to provide strength against the force applied by the lower jaw (3) and/or upper jaw (4) thereto, at least two isolation sheets (6) located on each plate (5) so as to stay opposite to each other and provide heat insulation, at least one male die (7) and at least one female die (8) positioned on the isolation sheet (6) located on the lower jaw (3) and/or upper jaw (4), and being able to be placed into each other in a completely form fitting manner, at least one workpiece (9) positioned between the male die (7) and female die (8) and being shaped by applying heat thereto (FIG. 1, FIG. 2, FIG. 3).

The sheet forming system (1) of the invention comprises more than one lateral wall (10) detachably mounted to the body (2) so as to almost completely surround each plate (5) and each isolation sheet (6), at least one induction heater (11) positioned by almost completely surrounding the workpiece (9) so as to stay between the workpiece (9) and the lateral walls (10).

In order to apply the force required for shaping the sheets, the body (2) containing the lower aw (3) and upper jaw (4) is used. The lower jaw (3) and upper jaw (4) are positioned on the body (2) so that they can move linearly towards each other. With the movement of the lower jaw (3) and upper jaw (4) towards each other, the plates (5) of a strength to withstand the forces the jaws will apply to each other are placed on the surfaces of the lower jaw (3) and upper jaw (4) so as to face each other. In order to provide insulation in the system, isolation sheets (6) are mounted on the surfaces of the plates (5) positioned so as to face each other on the lower jaw (3) and upper jaw (4). A male die (7) and a female die (8) are used for the sheet shaping process. The male die (7) is positioned on the surface of the isolation sheet (6) located on the lower jaw (3), and the female die (8) is positioned on the surface of the isolation sheet (6) located on the upper jaw (4). Thanks to this, when the lower jaw (3) and upper jaw (4) move towards each other, the female die (8) can be placed in the male die (7) in a form fitting manner. A workpiece (9) is inserted between the male die (7) and the female die (8) for the shaping process. Using the plates (5), the force applied by the lower jaw (3) and upper jaw (4) allows the workpiece (9) placed between the male die (7) and the female die (8) to be shaped under high temperature. In a preferred embodiment of the invention, a workpiece (9) in the form of a sheet with a thickness of less than three millimeters are used for the shaping process.

The temperature required for shaping the plates is provided by an induction heater (11) consisting of coils and used in the sheet forming system (1). The induction heater (11) is positioned in a way that almost completely surrounds the male die (7) and the female die (8). Thanks to this, the temperature values predetermined by the user during the shaping process can be controlled in order to distribute the heat homogeneously and the temperatures of the areas on the part where heat treatment is applied can be more easily controlled. The induction heater (11) is detachably mounted to the lateral walls (10). Thanks to this, it can be used in different shaping dies. The lateral walls (10) are detachably mounted to the body (2) so as to almost completely surround the plate (5) and the isolation sheet (6). Thanks to this, the induction heater (11) can be positioned in the lateral walls (10) in a way that almost completely surrounds the male die (7) and the female die (8).

In an embodiment of the invention, the sheet forming system (1) comprises at least one connection element (12) that allows the induction heater (11) to be detachably mounted to the lateral walls (10) so that there is a distance between the lateral walls (10) and the induction heater. Before the sheet shaping process, the induction heater (11) is mounted to the lateral walls (10) so that it can be removed after the process. Thanks to this, heaters of different sizes can be integrated to the lateral walls (10) and the lateral walls (10) and the induction heater (11) can also be used in different shaping systems.

In an embodiment of the invention, the sheet forming system (1) comprises at least two insulation plates (13) located on the lower jaw (3) and upper jaw (4) so as to stay between the isolation sheet (6) and the male die (7) and the isolation sheet (6) and the female die (8), thereby forming a thermal barrier between the isolation sheet (6) and the male die (7) and the female die (8). Insulation plates (13) are used so as to stay between the isolation sheet (6) and the male die (7) and the isolation sheet (6) and the female die (8) in order to prevent to the highest possible level the transfer of heat transferred by the induction heater (11) to the male die (7), the female die (8) and the workpiece (9) from being transferred to the isolation sheet (6), plates (5), the lower jaw (3) and the upper jaw (4) located in the system.

In an embodiment of the invention, the sheet forming system (1) comprises at least one duct (14) extending along the entire length of the plate (5) in which a coolant is passed. The workpiece (9) must be cooled at a speed predetermined by the user after the shaping process. The workpiece (9) shaped can be cooled after the process using the coolant passed through the duct (14).

In an embodiment of the invention, the sheet forming system (1) comprises lateral walls (10) of which the inner lateral surfaces remaining opposite to the induction heater (11) are coated in an insulated manner. During the shaping process, there is a gap between the induction heater (11) placed in the lateral walls (10) and the lateral walls (10). In order for the shaping process to be successful, the temperature values in this area are expected to remain constant in accordance with the process values. For this reason, an insulating material coating is carried out on the surfaces of the lateral walls (10) facing the induction heater (11) in order to provide thermal insulation.

In an embodiment of the invention, the sheet forming system (1) comprises at least one sealing element (15) placed on the lateral walls (10) to almost completely prevent the air permeability of the lateral walls (10) during the shaping process. As a result of the movement of the lower jaw (3) and upper jaw (4) towards each other, the lateral walls (10) staying opposite to each other come on top of each other and create an area that will provide isolation for the induction heater (11), male die (7), female die (8) and workpiece (9) that stay therein. Sealing elements (15) are placed on the mutually facing surfaces of the lateral walls (10) in order to enhance the continuity of the isolated environment and reduce the permeability.

In an embodiment of the invention, the sheet forming system (1) comprises a first sealing element (151) in a strip form on the lateral wall (10) located on the lower jaw (3) and a second sealing element (152) in a strip form on the lateral wall (10) located on the upper jaw (4). The first sealing element (151) and the second sealing element (152) in the form of a strip are applied along the entire length of the mutually facing surfaces of the lateral walls (10) (FIG. 3).

In an embodiment of the invention, the sheet forming system (1) comprises a first sealing element (151) and a second sealing element (152) located on the lateral wall (10) so as to almost completely contact each other during the shaping process of the workpiece (9).

In an embodiment of the invention, the sheet forming system (1) comprises lateral walls (10) that provide strength against the force applied by the lower jaw (3) and/or upper jaw (4) when their mutually facing surfaces are closed during the shaping process. In order to shape the workpiece (9), heat is applied by the induction heater (11) and force is applied by the lower jaw (3) and upper jaw (4). In the process where the force is applied, the lateral walls (10) that provide insulation by becoming closed on each other are aimed to be strong enough to bear the applied force.

In an embodiment of the invention, the sheet forming system (1) comprises an induction heater (11) consisting of flat coils. The induction heater (11) consisting of flat coils positioned in the lateral walls (10) in a way that almost completely surrounds the workpiece (9) provides the heat required for shaping the workpiece (9) by using the induction heating method.

In an embodiment of the invention, the sheet forming system (1) comprises an isolation sheet (6) made of a mica and/or ceramic material. Isolation sheets (6) made of a mica and/or ceramic material provide the thermal isolation required during the shaping process. In this way, the workpiece (9) is shaped at a temperature predetermined by the user.

In an embodiment of the invention, the sheet forming system (1) comprises a plate (5) made of an aluminum and/or steel material. The plates (5) made of an aluminum and/or steel material can show strength against the shaping force applied by the lower jaw (3) and/or upper jaw (4).

In an embodiment of the invention, the sheet forming system (1) comprises a workpiece (9) made of a metal or a composite material. The shaping process using the induction heater (11) is used for workpieces (9) made of a metal or a composite material.

In an embodiment of the invention, the sheet forming system (1) comprises an insulation plate (13) made of a stainless steel material. In order to prevent the heat supplied by the induction heater (11) from reaching the insulation plate (6), an insulation plate (13) made of a stainless steel material with a low magnetic field sensitivity is used.

The invention claimed is:

1. A sheet forming system (1) comprising:
   a body (2);
   a lower jaw (3) and a upper jaw (4), the lower jaw (3) and the upper jaw (4) each located on the body (2) so as to stay opposite to each other and to move towards each other to apply force during a shaping process;
   at least two plates (5) located on the each of the lower jaw (3) and upper jaw (4) to provide strength against the force applied by the lower jaw (3) and the upper jaw (4) thereto;
   at least two isolation sheets (6) located on each plate (5) so as to stay opposite to each other to provide heat insulation;
   at least one male die (7) positioned on the isolation sheet (6) located on the lower jaw (3) and at least one female die (8) positioned on the isolation sheet (6) located on the upper jaw (4) and arranged to be placed into each other in a completely form compliant manner;
   at least one workpiece (9) positioned between the male die (7) and female die (8) and being shaped by applying heat thereto,
   a plurality of lateral walls (10) detachably mounted to the body (2) and arranged to surround each insulation sheet (6) and each plate (5); and
   at least one induction heater (11) arranged to completely surround the workpiece (9) and to stay between the workpiece (9) and the lateral walls (10).

2. The sheet forming system (1) according to claim 1, comprising at least one connection element (12) that allows the induction heater (11) to be detachably mounted to the lateral walls (10) so that there is a distance between the lateral walls (10) and the induction heater.

3. The sheet forming system (1) according to claim 1, comprising at least two insulation plates (13) located on the lower jaw (3) and the upper jaw (4), one of the at least two insulation plates (13) arranged between the isolation sheets (6) and the male die (7) on the lower jaw (3) and another of the at least two insulation plates (13) arranged between the isolation sheets (6) and the female die (8) on the upper jaw (4), thereby forming a thermal barrier between a respective one of the male die (7) and the female die (8) and the isolation sheets (6) associated therewith.

4. The sheet forming system (1) according to claim 1, comprising at least one duct (14) through which a coolant is passed, extending completely along a length of the plates (5).

5. The sheet forming system (1) according to claim 1, wherein the lateral walls (10) have an insulating manner coating on their lateral surfaces and remaining opposite to the induction heater (11).

6. The sheet forming system (1) according to claim 1, comprising at least one sealing element (15) placed on the lateral walls (10) to almost completely prevent an air permeability of the lateral walls (10) during the shaping process.

7. The sheet forming system (1) according to claim 6, comprising a first sealing element (151) in a strip form on the lateral wall (10) located on the lower jaw (3) and a second sealing element (152) in a strip form on the lateral wall (10) located on the upper jaw (4).

8. The sheet forming system (1) according to claim 6, comprising a first sealing element (151) and a second sealing element (152) located on the lateral wall (10) so as to completely contact each other during the shaping process of the workpiece (9).

9. The sheet forming system (1) according to claim 1, wherein the lateral walls (10) provide strength against the force applied by the lower jaw (3) or the upper jaw (4) when their mutually facing surfaces are closed during the shaping process.

10. The sheet forming system (1) according to claim 1, wherein the induction heater (11) consists of flat coils.

11. The sheet forming system (1) according to claim 1, wherein at least one of the isolation sheets (6) is produced from a mica and/or ceramic material.

12. The sheet forming system (1) according to claim 1, wherein at least one of the plates (5) is produced from an aluminum and/or steel material.

13. The sheet forming system (1) according to claim 1, wherein the workpiece (9) is produced from a metal or a composite material.

14. The sheet forming system (1) according to claim 3, wherein at least one of the insulation plates (13) is produced from a stainless steel material.

* * * * *